(12) United States Patent
Park et al.

(10) Patent No.: US 11,070,730 B2
(45) Date of Patent: Jul. 20, 2021

(54) VIDEO CORRECTION METHOD AND DEVICE TO GENERATE STABILIZED VIDEO

(71) Applicant: LG ELECTRONICS INC., Seoul (KR)

(72) Inventors: Chanyong Park, Seoul (KR); Eunsung Lee, Seoul (KR); Hejin Cheong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 16/486,809

(22) PCT Filed: Apr. 17, 2019

(86) PCT No.: PCT/KR2019/004634
§ 371 (c)(1),
(2) Date: Aug. 16, 2019

(87) PCT Pub. No.: WO2020/213756
PCT Pub. Date: Oct. 22, 2020

(65) Prior Publication Data
US 2019/0364208 A1    Nov. 28, 2019

(51) Int. Cl.
*H04N 5/232*    (2006.01)
*G06T 7/246*    (2017.01)
*G06K 9/00*    (2006.01)

(52) U.S. Cl.
CPC ..... *H04N 5/23254* (2013.01); *G06K 9/00744* (2013.01); *G06T 7/246* (2017.01);
(Continued)

(58) Field of Classification Search
CPC ........... H04N 5/23254; H04N 5/23267; H04N 5/23274; G06T 7/246; G06T 2207/20132; G06K 9/00744
See application file for complete search history.

(56) References Cited

U.S. PATENT DOCUMENTS

2012/0105654 A1* 5/2012 Kwatra .................. G06T 7/246
348/208.4
2014/0226070 A1* 8/2014 Zheng .................... H04N 5/21
348/607

FOREIGN PATENT DOCUMENTS

KR    1020120135488    12/2012
KR    1020140136802    12/2014
(Continued)

OTHER PUBLICATIONS

PCT International Application No. PCT/KR2019/004634, Notification of Transmittal of the International Search Report and the Written Opinion of the International Searching Authority, or Declaration dated Jan. 17, 2020, 10 pages.

*Primary Examiner* — Nicholas G Giles
(74) *Attorney, Agent, or Firm* — Lee, Hong, Degerman, Kang & Waimey

(57) ABSTRACT

Provided is a video correction method comprising: extracting a common feature point from a number of video frames corresponding to a correction window size; extracting a trace of the feature point from the video frames; calculating an average value of the trace in the video frames; extracting a stabilized trace from a circular queue circular queue buffer using the trace and the average value; and applying a repositioning operation and a perspective warping operation to the video frames based on the stabilized trace to generate a stabilized video.

14 Claims, 15 Drawing Sheets

(52) U.S. Cl.
CPC ..... *H04N 5/23267* (2013.01); *H04N 5/23274* (2013.01); *G06T 2207/20132* (2013.01)

(56) References Cited

FOREIGN PATENT DOCUMENTS

| | | |
|---|---|---|
| KR | 1020150011938 | 2/2015 |
| KR | 1020170098079 | 8/2017 |
| WO | 2007095079 | 8/2007 |

\* cited by examiner (a)

| Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| Input | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| ReProject Buffer | 1 | 2 | 3 | 4 | 5 | 6 | 7 | 8 | 9 | 10 | 11 | 12 | 13 | 14 | | | | | | | | | | | | | |
| FC Buffer | 1 | | 2 | | 3 | | 4 | | 5 | | 6 | | 7 | | | | | | | | | | | | | | |

1310 — Index
1320 — Input
1330 — ReProject Buffer
1340 — FC Buffer
1335
1345

(a)

(b)

(c)

VIDEO CORRECTION METHOD AND DEVICE TO GENERATE STABILIZED VIDEO

CROSS-REFERENCE TO RELATED APPLICATIONS

This application is the National Stage filing under 35 U.S.C. 371 of International Application No. PCT/KR2019/004634, filed on Apr. 17, 2019, the contents of which are all hereby incorporated by reference herein in its entirety.

TECHNICAL FIELD

The present disclosure relates to a video correction method and device. More particularly, the present disclosure relates to a video correction method and device that can analyze a video to minimize a video shake caused by a user's hand-shake motion.

BACKGROUND ART

When shooting a video with a terminal or the like that includes a lens, such as a camera, a video shake phenomenon occurs due to the hand-shake of the user.

Electronic Image Stabilization (EIS), Digital Image Stabilization (DIS), or Optical Image Stabilization (OIS) methods are used to prevent the video shake due to the hand-shake.

In Electronic Image Stabilization (EIS), and Digital Image Stabilization (DIS), correction algorithms correct shaky images. EIS and DIS have a merit of being inexpensive because they are based on a software method. However, there is a disadvantage that deterioration occurs after the correction.

On the other hand, in Optical Image Stabilization (OIS), the shake of the terminal is sensed using a sensor installed in the terminal and the shake may be corrected by moving the lens in the opposite direction to the direction of the shake. OIS has the advantage that it can correct the hand-shake without deteriorating the image quality, but it requires additional space and the price of OIS is higher than the EIS and DIS.

When taking a temporary image such as a picture, it is possible to correct the handshake phenomenon to some extent by using electronic/digital/optical stabilization. However, when a moving image is taken for a certain period of time, and when a photographer moves too much, the video swings even when applying the electronic/digital/optical stabilization.

DISCLOSURE

Technical Purposes

A purpose of the present disclosure is to solve the above-mentioned problems and other problems. A purpose of the present disclosure is to provide a method and device for video correction, in which even when the user moves much while taking a moving image for a certain amount of time, the video may play back with little shake or smooth movement.

A purpose of the present disclosure is to provide a method and device for video correction, in which when a video obtained by taking an image for a long time, for example, in a time-lapse or hyper-lapse manner plays back in a high speed space movement and time flow manner, the video may play back in a smooth and non-shake manner.

Technical Solutions

In a first aspect of the present disclosure, there is provided a video correction method comprising: extracting a common feature point from a number of video frames corresponding to a correction window size; extracting a trace of the feature point from the video frames; calculating an average value of the trace in the video frames; extracting a stabilized trace from a circular queue circular queue buffer using the trace and the average value; and applying a repositioning operation and a perspective warping operation to the video frames based on the stabilized trace to generate a stabilized video.

In one implementation of the first aspect, the method further comprises: cropping the stabilized video; and when a hole is created in the cropped stabilization video, copying an image portion corresponding to the hole from a video frame preceding or subsequent to the cropped stabilization video.

In one implementation of the first aspect, extracting the stabilized trace includes: inputting the trace into the circular queue buffer; calculating a first stabilized trace by connecting median values between the trace and the average value; inputting the first stabilized trace into the circular queue buffer; calculating a second stabilized trace by connecting median values between the first stabilized trace and the average value; inputting the second stabilized trace into the circular queue buffer; calculating a third stabilized trace by connecting median values between the second stabilized trace and the average value; inputting the third stabilized trace into the circular queue buffer; and calculating and extracting the stabilized trace by connecting median values between the third stabilized trace and the average value.

In one implementation of the first aspect, the circular queue buffer has a fixed size, wherein the first to third stabilized traces are sequentially input to the circular queue buffer, wherein when the circular queue buffer becomes full, the oldest region in the circular queue buffer is overwritten.

In one implementation of the first aspect, the perspective warping includes calculating the degree of distortion based on the stabilized trace and performing the distortion correction based on the degree of distortion.

In one implementation of the first aspect, the method further comprises: performing a first removal of some video frames prior to extracting the feature point; and performing a second removal of some video frames after generating the stabilized video, thereby to generate a hyperlapse video.

In one implementation of the first aspect, a number of the removed video frames in the second removal is determined based on a speed of the hyperlapse video.

In one implementation of the first aspect, the method further comprises cropping a region excluding a hole in the hyperlapse video.

Technical Effects

In accordance with one embodiment of the present disclosure, even when the user moves much while taking a moving image for a certain amount of time, the video may play back with little shake or smooth movement.

In accordance with one embodiment of the present disclosure, when a video obtained by taking an image for a long time, for example, in a time-lapse or hyper-lapse manner plays back in a high speed space movement and time flow manner, the video may play back in a smooth and non-shake manner.

BRIEF DESCRIPTION OF THE DRAWINGS

FIG. 13 shows a principle of generating a timelapse or hyperlapse according to another embodiment of the present disclosure.

DETAILED DESCRIPTIONS

Figure 1:
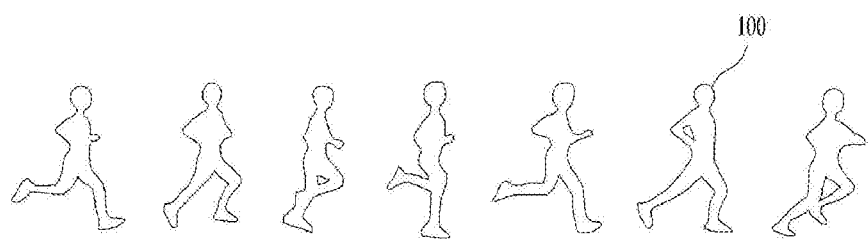
FIG. 1 shows a state of a terminal when a user shoots a video using the terminal while moving.
Figure 1:
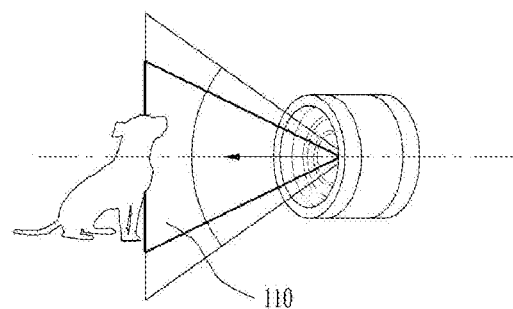
Figure 1:
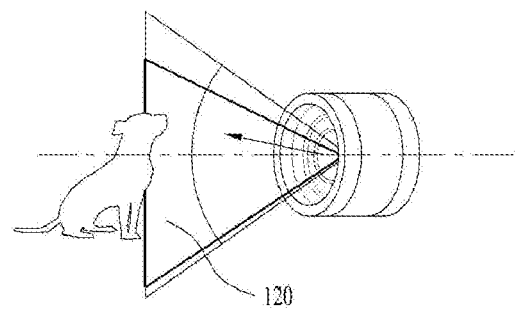
Figure 1:
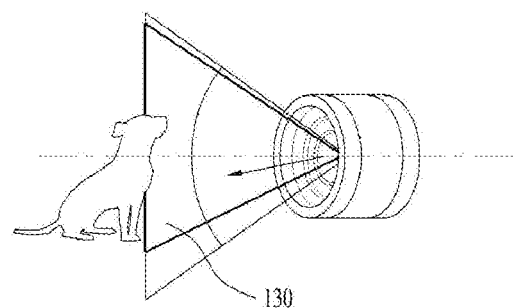

Examples of various embodiments are illustrated and described further below. The same reference numbers in different figures denote the same or similar elements, and as such perform similar functionality. Further, descriptions and details of well-known steps and elements are omitted for simplicity of the description. Suffixes "module" and "unit" for components used in the following description are to be given or mixed with other only in consideration of ease of drafting of the present disclosure, and may have the same meaning or role by itself. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Further, the accompanying drawings are included to provide easy understanding of the embodiments disclosed herein. The technical idea or scope as disclosed in the present specification is not limited to the attached drawings. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

FIG. 1 shows a state of a terminal when the user shoots a video using the terminal while moving.

When the user 100 who shoots the video takes an image while walking or running, the terminal for shooting the image is naturally shaken. For example, an object is captured from a front thereof in a video frame 110. However, the terminal faces above the object in the video frame 120, and the terminal faces below the object in the video frame 130. Therefore, when video frames are continuously played back, the entire screen shakes, and thus a video that is not stable is generated.

Figure 2:
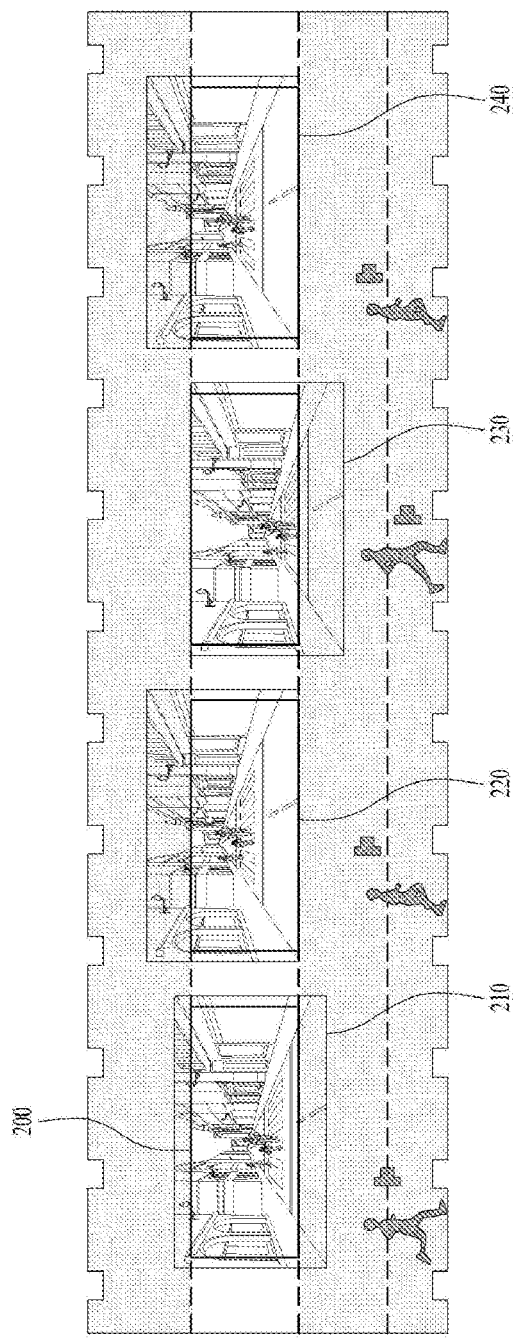
FIG. 2 shows a shake phenomenon that occurs when a user takes a video while moving.

FIG. 2 shows a shake phenomenon that occurs when a user takes a video while moving.

It may be assumed that when a center point 200 is defined in the video frames, the object is centered in a video frame 210. In a video frame 220, the terminal moves upwards above the terminal position in the video frame 210 and thus the object is present at a lower portion of the taken image. In a video frame 230, the terminal moves downwards below the terminal position in the video frame 210 and thus the object is present at an upper portion of the taken image. In a video frame 240, the terminal moves upwards above the terminal position in the video frame 210 and thus the object is present at a lower portion of the taken image. Thus, when the user captures the images while moving, the terminal moves along with the user. As a result, the video swings unexpectedly. The swing phenomenon destabilizes the video. When the viewer views the video, the swing phenomenon may cause dizziness. Thus, the swing phenomenon should be avoided.

Figure 3:
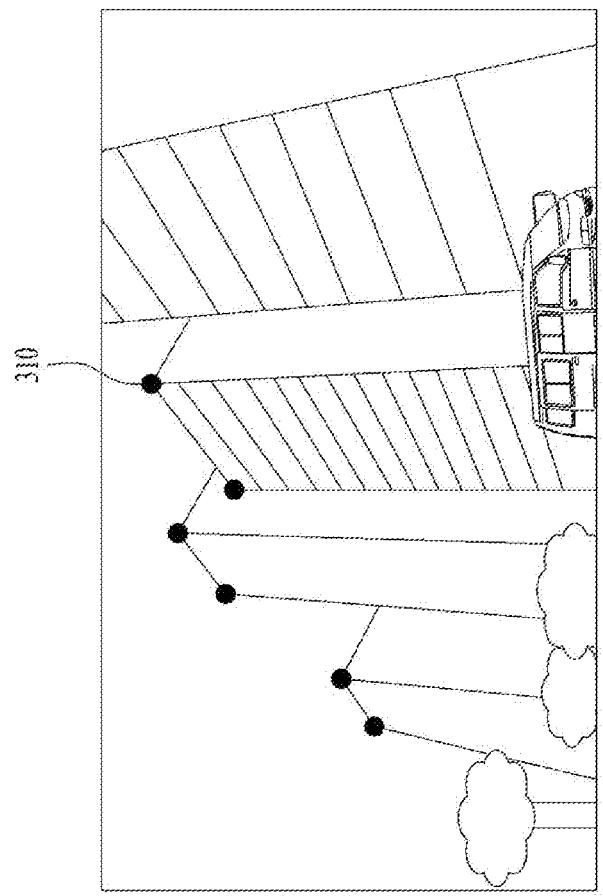
FIG. 3 shows feature points extracted from a video frame.

FIG. 3 shows feature points extracted from a video frame.

The feature point 310 refers to a point that may be a reference point in video frames. The number of the feature points may at least one. For example, when there is a building in the video frame, vertices of the building may be the feature points 310. It is desirable to select the feature point 310 as a point that may be distinct from the surrounding.

In selecting the feature point 310, machine learning or artificial intelligence may be used. That is, as data about the video frames accumulate, the feature point 310 may be extracted more precisely.

Figure 4:
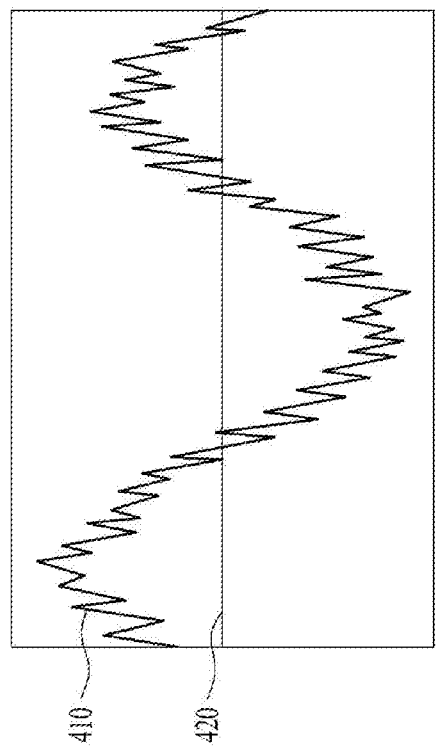
FIG. 4 shows a trace of a feature point extracted from video frames.

FIG. 4 shows a trace of feature point 310 extracted from video frames.

A trace 410 of the feature point 310 may be extracted based on a change of the position of the feature points 310 as extracted from the video frames between the frames. In FIG. 4, the trace 410 is extracted in a two-dimensional graph. However, a trace of the vertical and horizontal changes in the position of the feature point 310 can be extracted using a three-dimensional graph.

Further, a average value 420 of the trace 410 may be derived from the trace 410.

Figure 5:
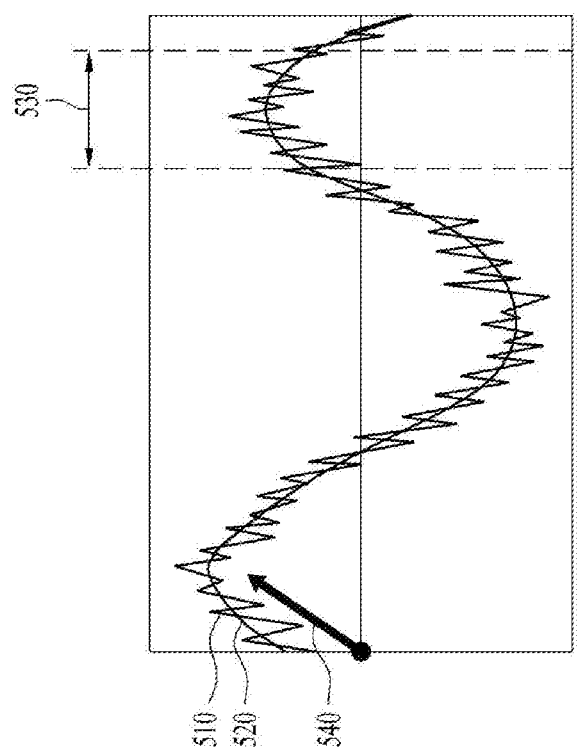
FIG. 5 shows a conventional hand-shake prevention method.

FIG. 5 shows a conventional hand-shake prevention method.

A correction window size 530 is intended to stabilize a trace 510 of the feature point 310. A stabilized trace 520 may be extracted by calculating an average value of the trace belonging to the correction window size 530 and by connecting median values between the trace and the average value. A position of the image is re-determined based on the stabilized trace 520 to determine a correction direction 540.

Conventionally, the hand-shake prevention technique is mainly applied to a picture. Thus, the correction window size 530 is very small. In addition, when increasing the correction window size 530, this conventional approach will need a larger amount of memory because the number of video frames to be stored in a buffer for calculation increases. Therefore, conventionally, it was difficult to increase the correction window size 530 due to a cost problem. Further, there was no need to enlarge the correction window size 530.

However, when the conventional hand-shake prevention technique is applied to a moving image or video, a fine hand-shake such as a very small vibration can be corrected. However, when there was a large movement, such as when the user was shooting while moving, the large shake may not be corrected. As a result, although there was no shake of the image in the video play back, it was difficult to prevent a swing phenomenon in which the image moves up, down, left, and right in a large degree. Thus, in accordance with the present disclosure, an approach is suggested in which the correction window size 530 is increased in correcting the moving image to prevent the swing phenomenon using a small memory capacity.

Figure 6:
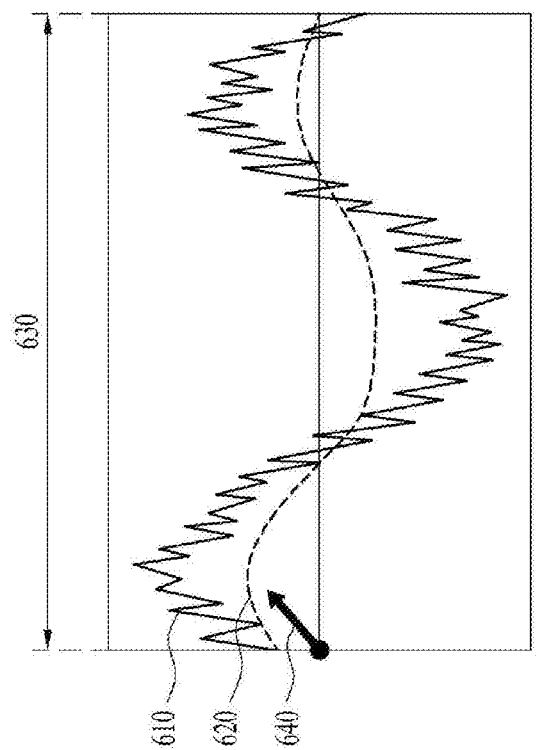
FIG. 6 shows a hand-shake prevention method according to one embodiment of the present disclosure.

FIG. 6 shows a hand-shake prevention method according to one embodiment of the present disclosure.

In accordance with the present disclosure, the correction window size 630 is set to be larger than that in the conventional one. An average value of the trace 610 belonging to the correction window size 630 is obtained. For example, the correction window size 630 may be up to 60 video frames. Then, median values between the trace 610 and an average value thereof are connected to each other to extract the stabilized trace 620. Then, the present approach may determine a correction direction 640 by repositioning the video according to the stabilized trace 620. The trace 510 in FIG. 5 and the trace 610 in FIG. 6 are the same trace. However, the stabilized trace 510 of FIG. 5 and the stabilized trace 620 of FIG. 6 are different from each other as the correction window size is set differently therebetween. As a result, the correction direction 540 in FIG. 5 and the correction direction 640 in FIG. 6 are different from each other. It may be seen that the correction direction 640 in FIG. 6 has a gentler slope than the slope of the correction direction 540 in FIG. 5.

The correction direction 640 having the gentler slope means that even when the video is shaken for a long period of time, a correction according to the stabilized trace 620 results in less swing.

Figure 7:
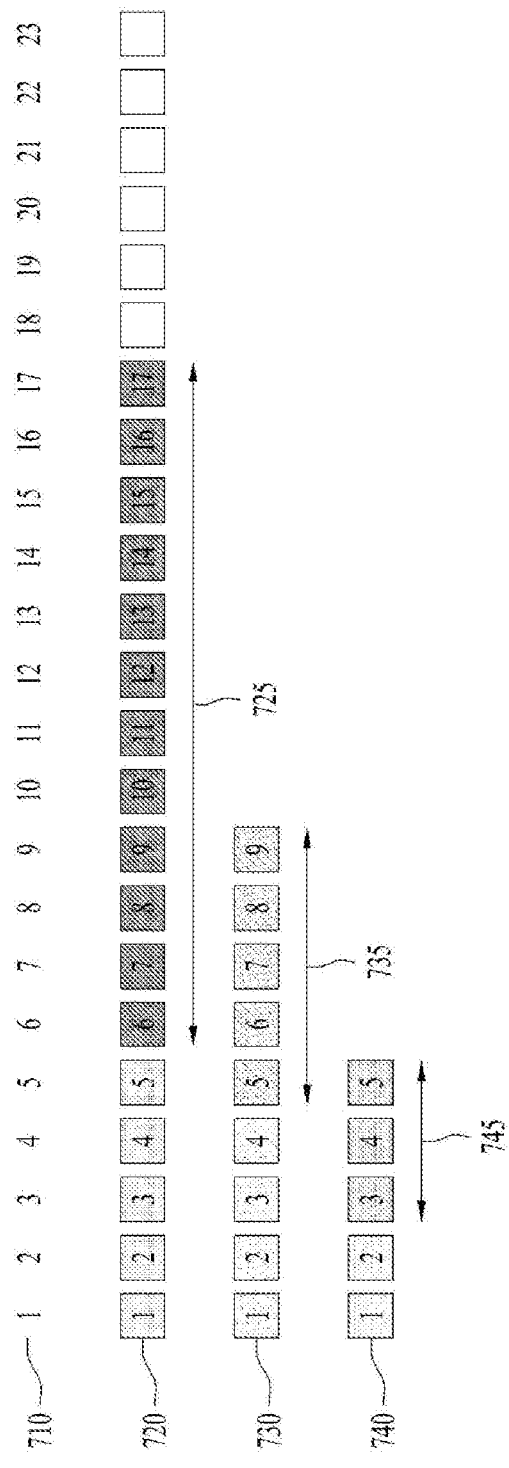
FIG. 7 shows a circular queue buffer in a video frame manner according to one embodiment of the present disclosure.

FIG. 7 shows a circular queue buffer in a video frame manner according to one embodiment of the present disclosure.

According to a video frame index 710, video frames are arranged in a first layer 720, a second layer 730 and a third layer 740. A first stabilization operation 725 is sequentially performed on the video frames arranged in the first layer 720. The corrected trace resulting from the first stabilization operation 725 is called a first stabilized trace. Further, as the first stabilization operation 725 is performed, video frames may have the same trace. Thus, video frames except for the video frames having the same trace are placed in the second layer. Then, a second stabilization operation 735 is sequentially performed on the video frames arranged in the second layer 730. The corrected trace resulting from the second stabilization operation 735 is called a second stabilized trace. Further, as the second stabilization operation 735 is performed, video frames may have the same trace. Thus, video frames except for the video frames having the same trace are placed in the third layer. Then, a third stabilization operation 745 is sequentially performed on the video frames arranged in the third layer 740. The corrected trace resulting from the third stabilization operation 745 is called a third stabilized trace. Further, as the third stabilization operation 735 is performed, video frames may have the same trace. Thus, video frames except for the video frames having the same trace is called a last stabilized trace.

Each of the first to third stabilization operations 725, 735, and 745 calculates the trace of the video frame and median values between the trace and an average value of the trace.

Therefore, in order that the correction window size is set to be large, and the first to third stabilization operations 725, 735, and 745 are executed, this requires a lot of memory capacity. To solve this problem, in accordance the present disclosure, the present approach uses a circular queue buffer.

Figure 8:
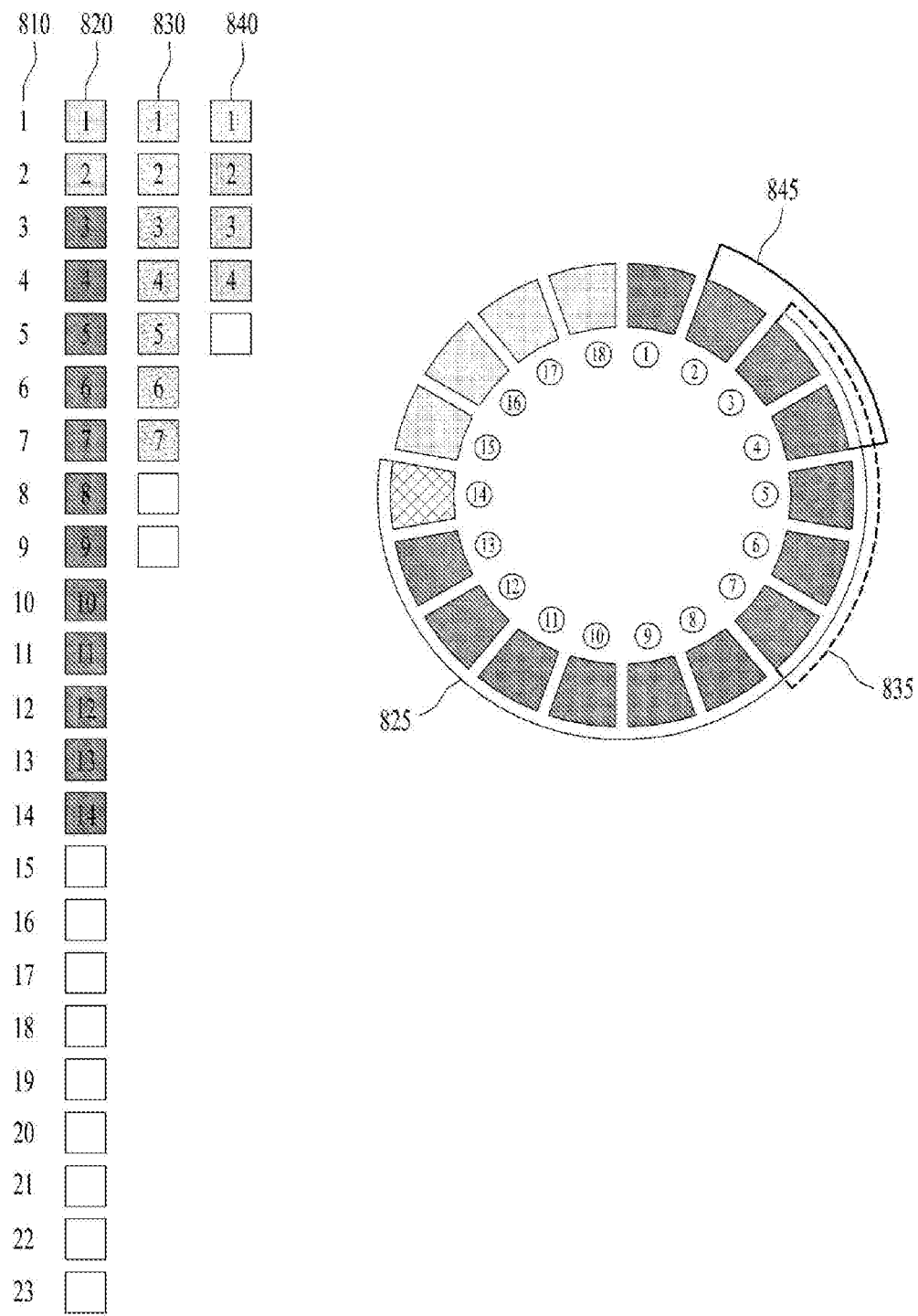
FIG. 8 shows a video frame representation and a graphical representation of a circular queue buffer according to one embodiment of the present disclosure.

FIG. 8 shows a video frame representation and a graphical representation of a circular queue buffer according to one embodiment of the present disclosure.

According to a video frame index 810, video frames are arranged in the first layer 820, second layer 830 and third layer 840. The stabilization operation is performed using a circular queue buffer.

For example, a circular queue buffer may have a capacity to receive only 18 video frames. After inputting the video frames arranged in the first layer 820 into a region #1, a region #2, a region #3, . . . of the circular queue buffer respectively, a first stabilization operation 825 is sequentially performed thereon. For example, even when the first stabilization operation 825 is performed on the video frames of the #1 and #2 regions, there is no change in the trace thereof, the video frames of the #1 and #2 regions remain in the circular queue buffer. When there is a change in the trace of the video frame of the region #3, the video frame in the region #3 is overwritten. Further, the first stabilization operation 825 may result in the video frame having the same trace. Thus, the video frame having the same trace may be removed. As a result, the video frames of the first layer 820 present in a range from the #1 region to the #14 region of the circular queue buffer are stored in a range of the #1 region to the #7 region in the second layer 830 via the first stabilization operation 825. The same procedure may be executed, such that the video frames of the second layer 820 stored in a range to the #7 region from the #1 region are stored in a range of the #1 region to the #4 region in the third layer 840 via the second stabilization operation 835. A third stabilization operation 845 is performed on the third layer 840 to extract the last stabilized trace.

Then, the present approach may reposition the video frames based on the extracted last stabilized trace and may perform a perspective warp.

Figure 9:
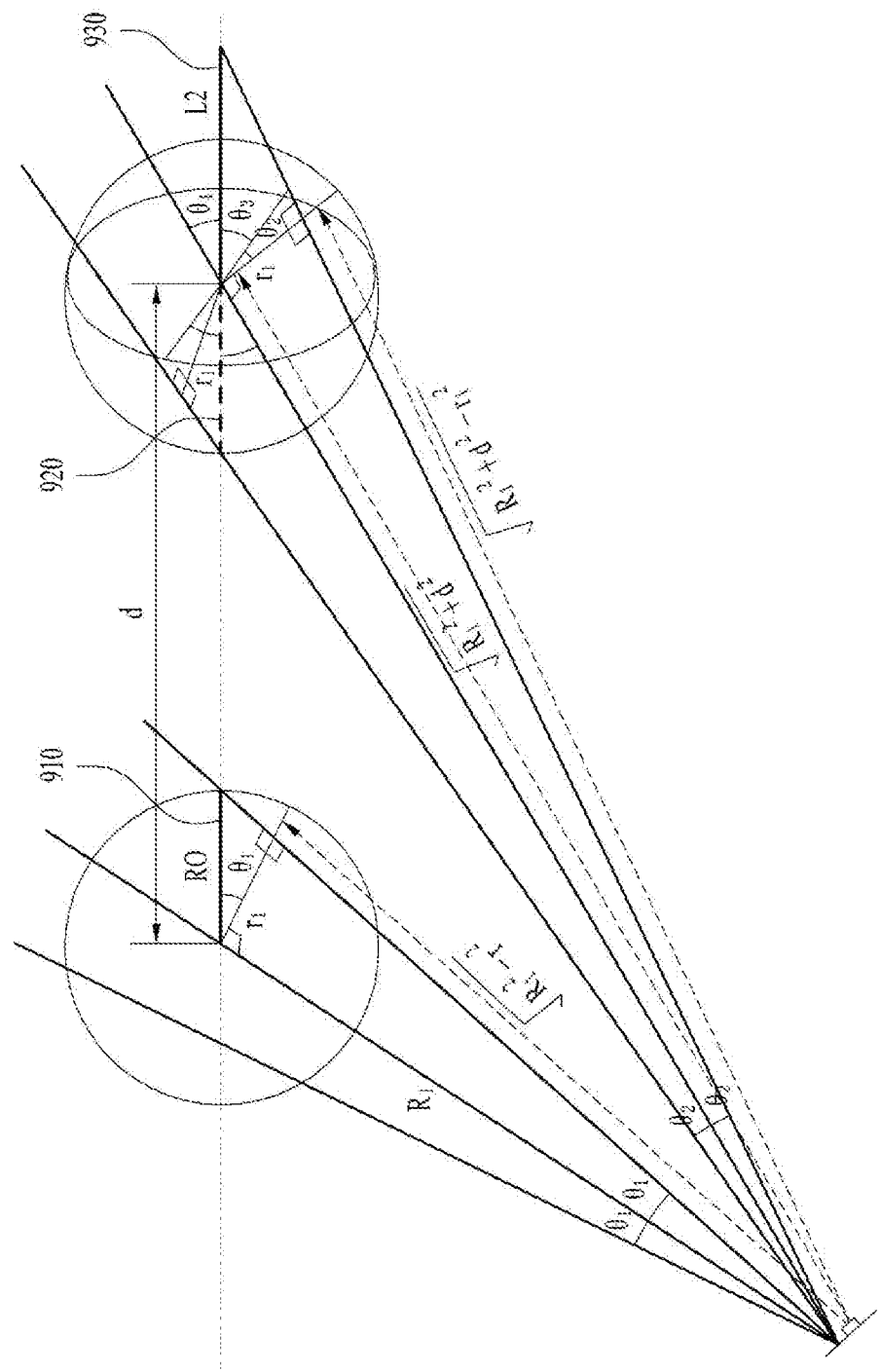
FIG. 9 shows a principle of applying a perspective warp according to one embodiment of the present disclosure.

FIG. 9 shows a principle of applying a perspective warp according to one embodiment of the present disclosure.

When repositioning video frames based on the last stabilized trace, the center point at the time of shooting the image and the center point of the image after the repositioning will be different from each other. When the center point varies in this way, a perspective should be changed accordingly. For example, a view angle when the same object is at the center of the image is different from a view angle when the same object is at the top of the image. Thus, a shape of the object must be corrected accordingly to get a natural image.

The correction may vary depending on the lens of the terminal. For example, the correction may vary between a flat lens and a circular lens.

For example, when a circular object is moved by a distance d, an existing diameter 910 of the circular object becomes a diameter 920 of the circular object after the movement. Then, a diameter 930 resulting from the perspective warp application based on the travel distance and the travel angle may be extracted.

Figure 10:
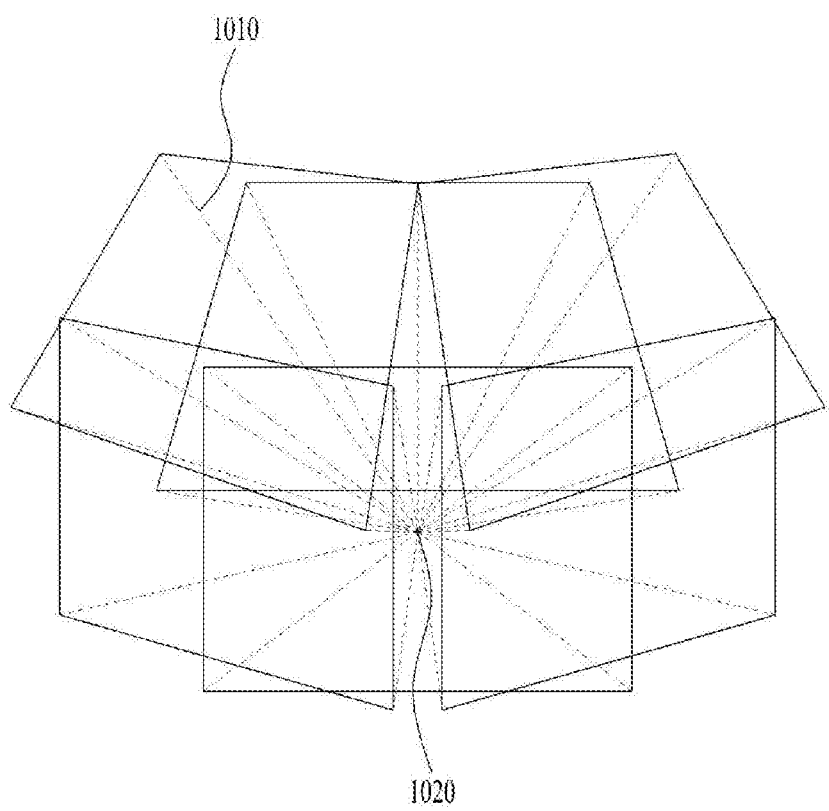
FIG. 10 is a graphical representation of a principle of applying a perspective warp according to one embodiment of the present disclosure.

FIG. 10 is a graphical representation of the principle of applying a perspective warp according to one embodiment of the present disclosure.

The center point 1020 is determined according to the last stabilized trace. Accordingly, while moving the image only horizontally and vertically while re-arranging the positions of the video frames 1010, the perspective warp is applied to correct an angles and length.

Figure 11:
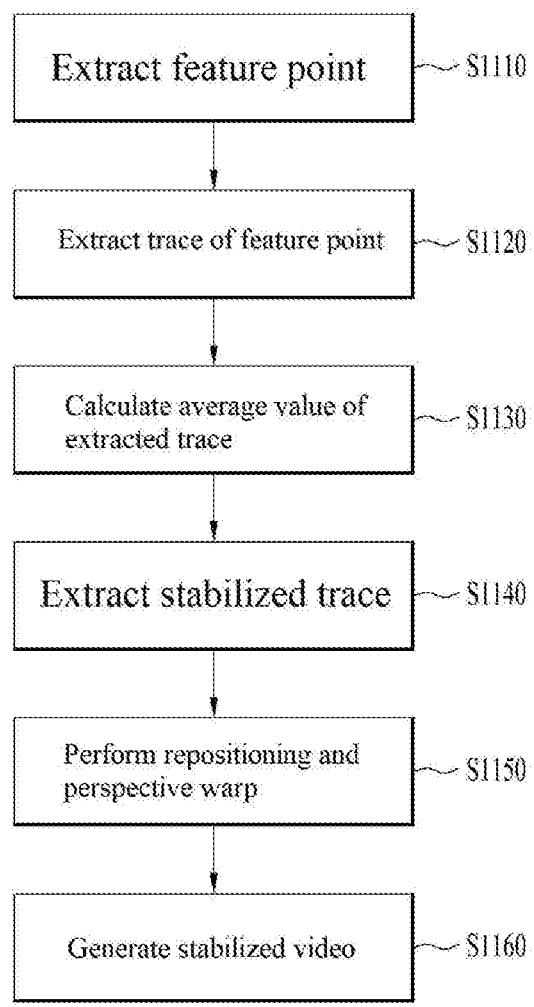
FIG. 11 shows a flow chart of a video correction method according to one embodiment of the present disclosure.

FIG. 11 shows a flow chart of a video correction method according to one embodiment of the present disclosure.

First, feature points are extracted from the video frames in the correction window size S1110. In S1120, the present method may extract a trace of the feature point by connecting extracted feature points. The average value of the extracted trace is calculated S1130. The stabilized trace is extracted from the circular queue buffer using the trace and average value S1140. For example, to extract the stabilized trace, the stabilization operation may be repeated three times. The operation uses the circular queue buffer. The circular queue buffer has a fixed memory size. Thus, due to the nature of the circular queue buffer, the present method can process more video frames than those that the memory has. Based on the stabilized trace, the method may reposition the video frames and perform the perspective warp S1150. The video frames subjected to the stabilization operation, repositioning and perspective warp are combined with each other to generate stabilized video S1160.

Figure 12:
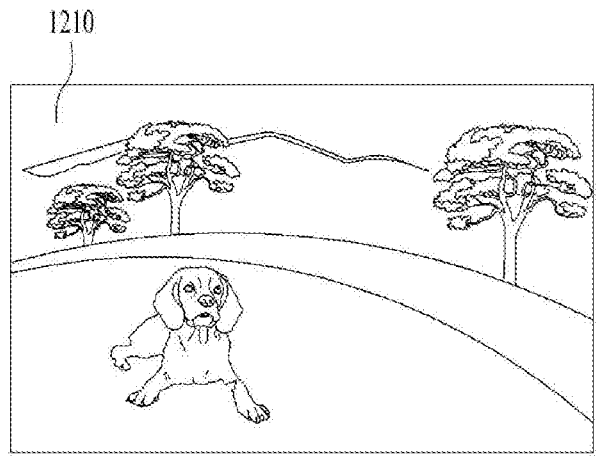
FIG. 12 shows an application of a hole filling technique according to one embodiment of the present disclosure.
Figure 12:
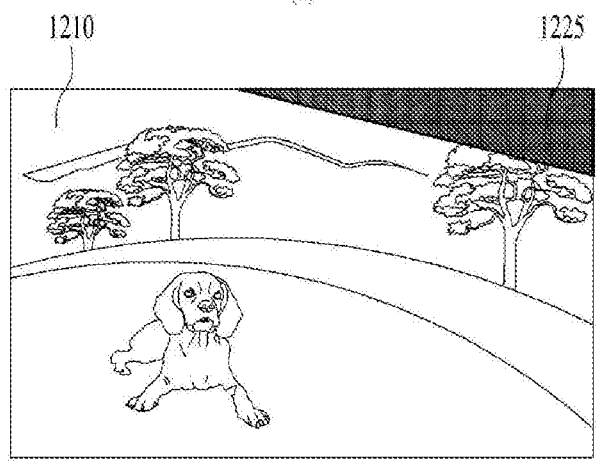
Figure 12:
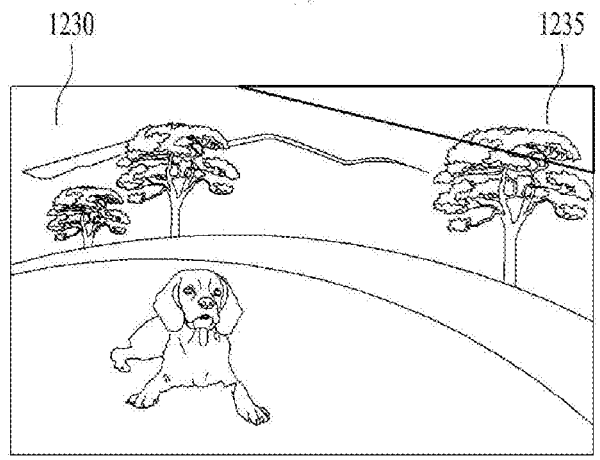

FIG. 12 is a diagram showing applying a hole filling technique according to one embodiment of the present disclosure.

When the repositioning and perspective warp are applied to the original video frame 1210 according to the last stabilized trace, the video frame 1220 will have a hole 1225. Specifically, the hole 1225 is a region that is not photographed at the time of photographing the video frame 1220, but occurs when the center point is changed according to the repositioning. To solve this problem, a region corresponding to the hole 1225 is copied from a video frame before or after the current video frame 1220 and then pasted to the video frame 1220. As a result, the video frame 1230 after applying the hole filling scheme is a combination of the video frame 1220 and the region corresponding to the hole 1235 in the other video frame.

FIG. 13 shows a principle of generating timelapse or hyperlapse according to another embodiment of the present disclosure.

The timelapse or hyperlapse is one of the techniques of video shooting. In the timelapse or hyperlapse scheme, a video taken during a certain period of time is viewed to a viewer as if the video plays back fast.

Conventionally, in order to produce a timelapse or hyperlapse video, video frames may be extracted and combined with each other at regular time intervals. However, when the conventional method creates the timelapse or hyperlapse video while the user is moving, the center point of the video frame changes greatly at certain time intervals, and thus the swing phenomenon becomes worse.

Thus, in one embodiment of the present disclosure, when the present approach creates the timelapse or hyperlapse video having the same speed as the conventional one, the present approach may extract the stabilized trace from more video frames in a certain time interval and may apply the repositioning and perspective warp thereto. Thereafter, the present approach may delete some video frames based on the desired speed. Therefore, it is possible to extract the stabilized trace with less shake than the conventional one to minimize the shake or swing in the timelapse or hyperlapse video.

According to another embodiment of the present disclosure, a buffer may be used to generate the timelapse or hyperlapse. First, the original video frames are input to an input buffer 1320 by the correction window size 1335 in the order of the buffer index 1310. Then, the present approach may extract the last stabilized trace while some video frames are removed. Based on the extracted last stabilized trace, the repositioning and perspective warp are applied to the video. Then, the resulting video is input to a play back buffer 1330. Then, some video frames are removed according to the desired speed. Then, a region where no hole occurs in each of the video frames is cropped and the cropped portion is input to a frame buffer 1340. The present approach may combine the video frames into the frame buffer 1340 to create the timelapse or hyperlapse.

Figure 14:
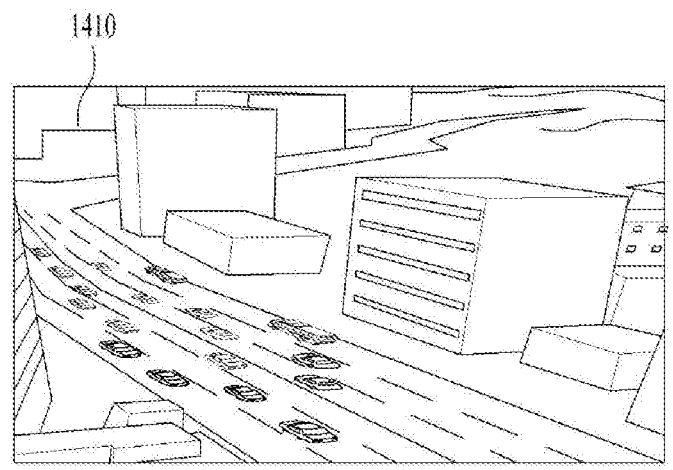
FIG. 14 is a diagram showing a method for generating a timelapse or hyperlapse according to one of the other embodiments of the present disclosure.
Figure 14:
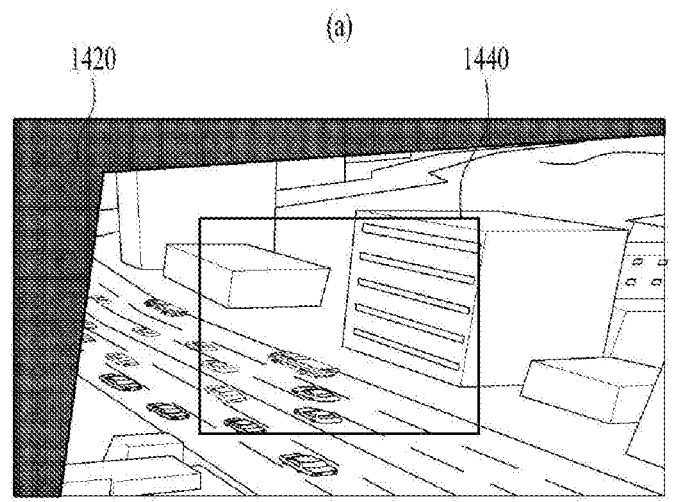
Figure 14:
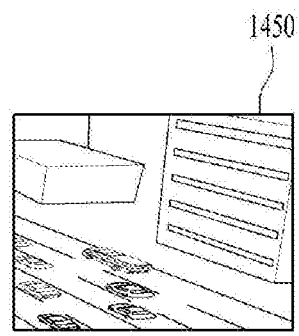

FIG. 14 shows a method for generating timelapse or hyperlapse according to another embodiment of the present disclosure.

A corrected video frame 1420 resulting from the stabilization operation, repositioning, and perspective warp application to the original video frame 1410 may be extracted. A hole 1430 may occur during the repositioning and perspective warp application. Accordingly, the region 1440 having no hole 1430 is cropped to generate a last timelapse or hyperlapse video frame 1450.

Figure 15:
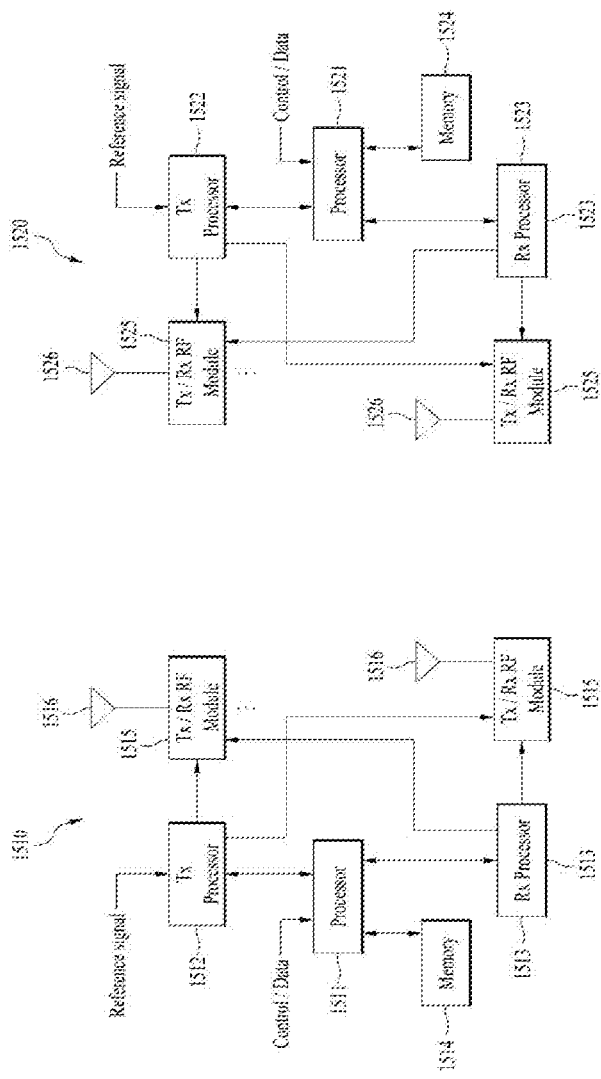
FIG. 15 shows a video correction device according to one embodiment of the present disclosure.

FIG. 15 shows a video correction device according to one embodiment of the present disclosure.

The present disclosure may also be applied in conjunction with communications technology. The video correction device may be supplemented to specify or clarify the technical characteristics of the methods proposed in accordance with the present disclosure. It is not necessary to include all the components shown in FIG. 15. Some components may be omitted if necessary. Therefore, only a processor and a memory may perform video correction according to one embodiment of the present disclosure. When the terminal is able to communicate with an external server, the server may perform video correction.

A wireless communication system includes a first communication device 1510 and/or a second communication device 1520. 'A and/or B' may be interpreted to have the same meaning as including at least one of A or B. In one example, the first communication device is a base station (BS), while the second communication device is user equipment (UE). In another example, the first communication device is UE, while the second communication device is BS.

The first communication device and the second communication device may include processors 1511 and 1521, memories 1514 and 1524, one or more Tx/Rx RF modules (radio frequency modules) 1515 and 1525, Tx processors 1512 and 1522, Rx processors 1513 and 1523, and antennas 1516 and 1526 respectively. The Tx/Rx module is called a transceiver. The processor implements the functions, procedures, and/or methods discussed above. More specifically, in DL communication from the first communication device to the second communication device, a higher layer packet from a core network is provided to the processor 1511. The processor implements the functionality of the L2 layer. In the DL, the processor preforms multiplexing between the logical channel and the transport channel and supplies radio resource allocation to the second communication device 1520, and is responsible for signaling to the second communication device. The transmit (TX) processor 1512 implements various signal processing functions for the L1 layer, i.e., the physical layer. The signal processing function facilitates FEC (forward error correction) in the second communication device, and may include coding and interleaving. The encoded and interleaved signals are scrambled and modulated to complex valued modulation symbols. BPSK (binary phase shift keying), QPSK (quadrature phase shift keying), 16QAM quadrature amplitude modulation, 64QAM, and 246QAM may be used for modulation. The complex-valued modulation symbols (hereinafter, the modulation symbols) are divided into parallel streams. Each stream is mapped to an OFDM subcarrier which in turn is multiplexed with a reference signal RS in the time and/or frequency domain. The multiplexed reference signal RS and OFDM subcarrier may be combined with each other using IFFT (Inverse Fast Fourier Transform) to create a physical channel that carries a time domain OFDM symbol stream. The OFDM symbol stream is spatially precoded to produce multiple spatial streams. Each spatial stream may be provided to each of different antennas 1516 via a separate Tx/Rx module or transceiver. Each Tx/Rx module may frequency-upconvert each spatial stream to an RF carrier for transmission. In the second communication device, each Tx/Rx module or transceiver 1525 receives a signal on the RF carrier via each antenna 1526 of each Tx/Rx module. Each Tx/Rx module reconstructs the signal of the RF carrier into a baseband signal and provides the baseband signal to the receiving RX processor 1523. The RX processor implements the various signal processing functions of the physical layer L1. The RX processor may perform spatial processing on the information to recover any spatial stream destined toward the second communication device. If multiple spatial streams are directed to the second communication device, they may be combined into a single OFDMA symbol stream by multiple RX processors. The RX processor converts a time domain based OFDM symbol stream into a frequency domain based signal using a fast Fourier transform (FFT). The frequency domain based signal includes a separate OFDM symbol stream for each subcarrier of the OFDM signal. The reference signal and modulation symbols on each subcarrier are recovered and demodulated by determining the most likely signal constellation points as transmitted by the first communication device. These soft decision soft decisions may be based on channel estimate values. The soft decisions are decoded and deinterleaved to recover the data and control signals originally transmitted by the first communication device on the physical channel. The corresponding data and control signals are provided to the processor 1521.

The communication UL from the second communication device to the first communication device is processed in the first communication device 1510 in a manner similar to that as described in connection with the receiver function in the second communication device 1520. Each Tx/Rx module 1525 receives a signal via its respective antenna 1526. Each Tx/Rx module provides RF carrier and information to RX processor 1523. Processor 1521 may be associated with memory 1524 for storing program code and data. The memory may be referred to as a computer readable medium.

The computer readable medium includes all kinds of recording devices in which data that may be read by a computer system is stored. Examples of media that can be read by a computer include HDD (Hard Disk Drive), SSD (Solid State Disk), SDD (Silicon Disk Drive), ROM, RAM, CD-ROM, magnetic tape, floppy disk, or optical data storage device. The medium also includes a carrier wave, for example, implemented in the form of transmission over the Internet. Accordingly, the above description should not be construed in a limiting sense in all respects and should be considered illustrative. The scope of the present disclosure shall be determined by rational interpretation of the appended claims. All changes within the equivalent range of the present disclosure are included in the scope of the present disclosure.

INDUSTRIAL APPLICABILITY

The present disclosure refers to a video correction method/device that may be applied to various video imaging methods/devices or video correction methods/devices and thus is of industrial applicability.

What is claimed is:

1. A video correction method comprising:
    extracting a common feature point from a number of video frames corresponding to a correction window size;
    extracting a trace of the feature point from the video frames;
    calculating an average value of the trace in the video frames;
    extracting a stabilized trace from a circular queue buffer using the trace and the average value; and
    applying a repositioning operation and a perspective warping operation to the video frames based on the stabilized trace to generate a stabilized video,
    wherein the extracting the stabilized trace includes:
        inputting the trace into the circular queue buffer;
        calculating the stabilized trace by connecting median values between the trace and the average value; and
        inputting the stabilized trace into the circular queue buffer.

2. The video correction method of claim 1, wherein the method further comprises:
    cropping the stabilized video; and when a hole is created in the cropped stabilization video, copying an image portion corresponding to the hole from a video frame preceding or subsequent to the cropped stabilization video.

3. The video correction method of claim 1, wherein the extracting the stabilized trace further includes:
calculating a first stabilized trace by connecting median values between the trace and the average value;
inputting the first stabilized trace into the circular queue buffer;
calculating a second stabilized trace by connecting median values between the first stabilized trace and the average value;
inputting the second stabilized trace into the circular queue buffer;
calculating a third stabilized trace by connecting median values between the second stabilized trace and the average value;
inputting the third stabilized trace into the circular queue buffer; and
calculating and extracting the stabilized trace by connecting median values between the third stabilized trace and the average value.

4. The video correction method of claim 3, wherein the circular queue buffer has a fixed size, wherein the first to third stabilized traces are sequentially input to the circular queue buffer, wherein when the circular queue buffer becomes full, an oldest region in the circular queue buffer is overwritten.

5. The video correction method of claim 1, wherein the method further comprises:
performing a first removal of some video frames prior to extracting the feature point; and
performing a second removal of some video frames after generating the stabilized video, thereby to generate a hyperlapse video.

6. The video correction method of claim 5, wherein a number of the removed video frames in the second removal is determined based on a speed of the hyperlapse video.

7. The video correction method of claim 5, wherein the method further comprises cropping a region excluding a hole in the hyperlapse video.

8. A video correction device comprising:
a memory including a circular queue buffer; and
a processor coupled to the memory,
wherein the processor is configured for:
extracting a common feature point from a number of video frames corresponding to a correction window size;
extracting a trace of the feature point from the video frames;
calculating an average value of the trace in the video frames;
extracting a stabilized trace from a circular queue buffer using the trace and the average value; and
applying a repositioning operation and a perspective warping operation to the video frames based on the stabilized trace to generate a stabilized video,
wherein the extracting the stabilized trace includes:
inputting the trace into the circular queue buffer;
calculating a stabilized trace by connecting median values between the trace and the average value; and
inputting the stabilized trace into the circular queue buffer.

9. The video correction device of claim 8, wherein the processor is further configured for:
cropping the stabilized video; and
when a hole is created in the cropped stabilization video, copying an image portion corresponding to the hole from a video frame preceding or subsequent to the cropped stabilization video.

10. The video correction device of claim 8, wherein when the processor extracts the stabilized trace, the processor is further configured for:
calculating a first stabilized trace by connecting median values between the trace and the average value;
inputting the first stabilized trace into the circular queue buffer;
calculating a second stabilized trace by connecting median values between the first stabilized trace and the average value;
inputting the second stabilized trace into the circular queue buffer;
calculating a third stabilized trace by connecting median values between the second stabilized trace and the average value;
inputting the third stabilized trace into the circular queue buffer; and
calculating and extracting the stabilized trace by connecting median values between the third stabilized trace and the average value.

11. The video correction device of claim 10, wherein the circular queue buffer has a fixed size, wherein the first to third stabilized traces are sequentially input to the circular queue buffer, wherein when the circular queue buffer becomes full, an oldest region in the circular queue buffer is overwritten.

12. The video correction device of claim 8, wherein the processor is further configured for:
performing a first removal of some video frames prior to extracting the feature point; and
performing a second removal of some video frames after generating the stabilized video, thereby to generate a hyperlapse video.

13. The video correction device of claim 12, wherein a number of the removed video frames in the second removal is determined based on a speed of the hyperlapse video.

14. The video correction device of claim 12, wherein the processor is configured for cropping a region excluding a hole in the hyperlapse video.

* * * * *